June 23, 1970     K. E. HUGHES     3,517,383
TURN SIGNAL MONITOR
Filed March 20, 1967
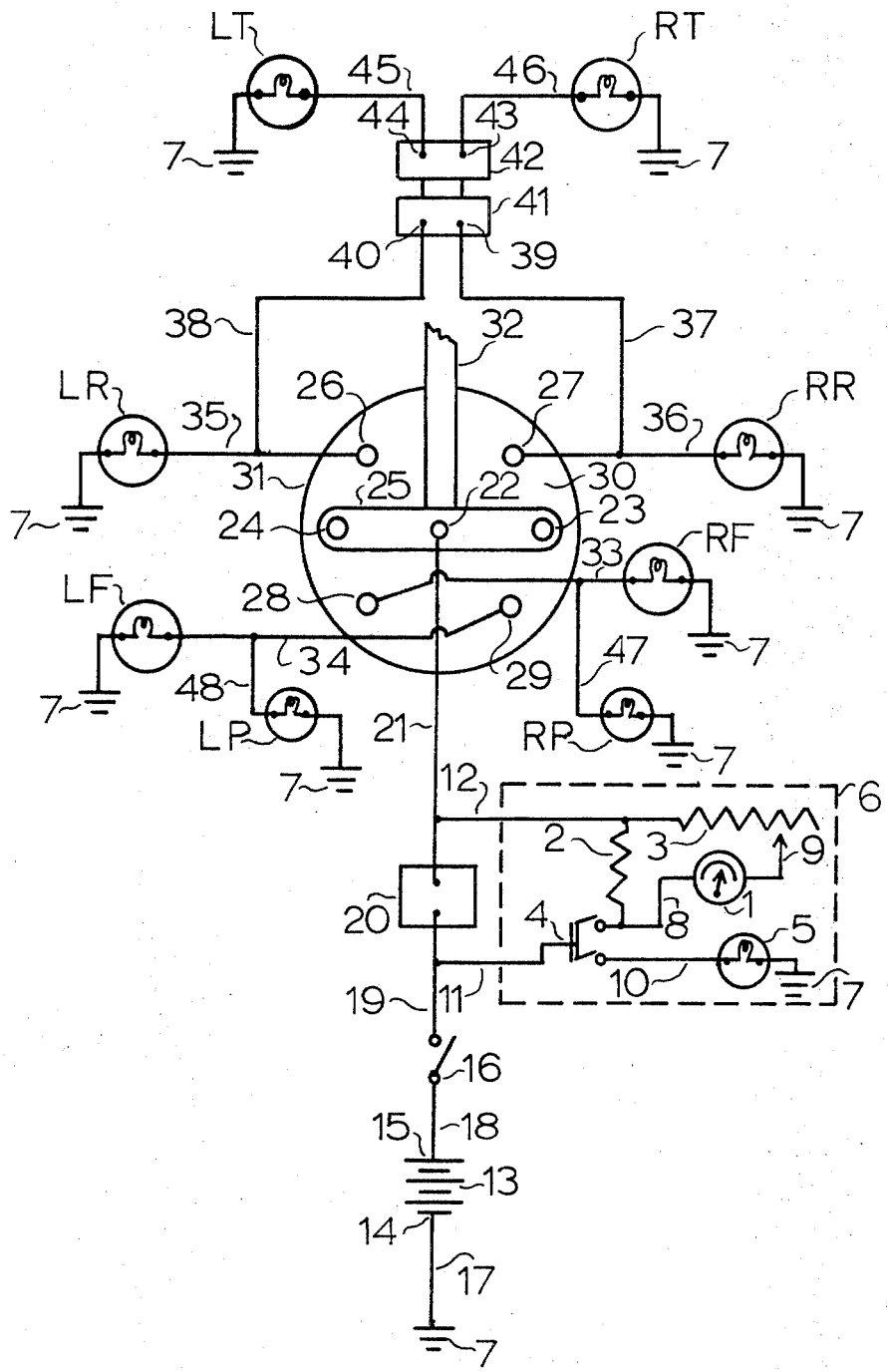
INVENTOR.
Kenneth E. Hughes United States Patent Office 3,517,383
Patented June 23, 1970

3,517,383
TURN SIGNAL MONITOR
Kenneth Edward Hughes, 4904 W. Vaughn Ave.,
Merced, Calif. 95340
Filed Mar. 20, 1967, Ser. No. 624,613
Int. Cl. B60g 1/38
U.S. Cl. 340—79
1 Claim

ABSTRACT OF THE DISCLOSURE

A conventional turn signaling system for vehicles including a source of electrical energy or battery, right and left turn signal lamps, a flasher unit, and a switch assembly movable lever for activating either the right or left bank of signal lamps. A device primarily designed for use in tow vehicles, which when activated provides a separate uninterrupted current path to either the right or left bank of signal lamps as selected by the switch assembly movable lever, on both a tow vehicle and the vehicle or vehicles being towed, and further providing a means of determining if the correct value of current is flowing in either bank of lamps, hence indicating proper operation of said system or malfunction of the same system. The value of current is determined through the process of sampling a very small portion of the total current flowing in the respective bank of turn signal lamps.

My invention relates to a new and useful device to be used in connection with conventional turn signaling systems for use on automobiles, trucks and the like which are used as tow vehicles. Such systems as used on vehicles in combination normally include right and left turn signal lamps on both front and rear or the tow vehicle and right and left turn signal lamps on the rear of the vehicle or vehicles being towed, being connected in parallel to those of the tow vehicle by means of inter-vehicle electrical cable connectors.

If a turn signal lamp or lamps burns out or otherwise becomes inoperative on any of the vehicles being operated in combination, this fact will not be noticed by the operator of the tow vehicle since the instrument panel directional signal indicator lamp within the tow vehicle will continue to flash as a result of electrical current being drawn through the flasher unit by remaining properly functioning signal lamps in the same electrical circuit.

It is obviously desirable to provide a means whereby the operator of vehicles in combination may periodically and routinely check for proper turn signal operation without the necessity of stopping and making a visual inspection of the entire system. This desirable feature is accomplished by the inclusion of my invention in a tow vehicle which provides both an increased safety factor and a time saving convenience.

Although the present device described in detail in the specification relates specifically to turn signal lamps on vehicles which employ a common lamp filament which serves as both a turn signal and stop light, it will nevertheless be appreciated that by means of simple switching, the basic device may be switched to check other functions such as separate stop lamps and tail lights on vehicles so equipped.

The principal object and essence of my invention is therefore to provide a device of the character herewithin described which provides the operator of an automotive tow vehicle with the capability of periodically and routinely checking left and right turn signal lamps on all vehicles in combination for possible malfunction of one or more of said signal lamps.

Another object of the invention is to provide a device of the character herewithin described which is simple in construction, economical in manufacture, easily incorporated into existing automotive signaling systems, is well suited to the purpose for which it is designed and may be conveniently removed from one tow vehicle and placed within a different tow vehicle.

With the foregoing in view, and all those objects, purposes or advantages which may become apparent from consideration of this disclosure and specification, the present invention consists of the concept embodied in the method, process, construction, arrangement of parts, or new use of same, as herein particularly exemplified in one or more specific embodiments of such concept, reference being had to the accompanying figure in which:

The figure of the drawing is an electrical schematic diagram of a typical automotive turn signaling system relating to two or more vehicles when operated in combination, with my device incorporated therein.

Proceeding therefore to describe my invention in detail, reference to the drawing will show that I have illustrated a source of electrical energy or battery 13, the negative side 14 of which is connected to ground 7 which conventionally consists of the vehicle frame, by means of electrical conductor 17. The positive side 15 of battery 13 is connected by means of electrical conductor 18 to a conventional ignition switch 16. Switch 16 is connected to a flasher device 20 by means of electrical conductor 19. An electrical conductor 21 extends from flasher device 20 to central contact 22 of directional signaling switch assembly 31 which consists of an electrically insulated base 30, a movable metallic strip 25 and lever 32. Electrically insulated base 30 carries contacts 26, 27, 28 and 29. Contacts 23 and 24 are common to central contact 22 by means of metallic strip 25 which is movable in either a clockwise direction, or a counterclockwise direction by means of electrically insulated operating lever 32.

Contact 28 is connected by means of electrical conductor 33 to right front turn signal lamp RF of the tow vehicle and thence to ground 7 in the conventional manner. Contact 29 is connected by means of electrical conductor 34 to left front turn signal lamp LF of the tow vehicle and thence to ground 7 in the conventional manner. Contact 27 is connected by means of electrical conductor 36 to right rear turn signal lamp RR of the tow vehicle, and thence to ground 7 in the conventional manner. Contact 26 is connected by means of electrical conductor 35 to left rear turn signal lamp LR of the tow vehicle, and thence to ground 7 in the conventional manner. Branch electrical conductors 47 and 48 connect to tow vehicle instrument pannel indicator lamps RP and LP respectively, and thence to ground 7 in the conventional manner. Electrical conductor 37 connects to contact 39 of male cable connector 41 thence to a corresponding contact 43 within female cable connector 42, thence by means of electrical conductor 46 to right turn signal lamp RT on the right rear of the vehicle being towed and thence to ground 7 in the conventional manner. Electrical conductor 38 connects to contact 40 of male cable connector 41 and thence to a corresponding contact 44 within female cable connector 42, thence by means of electrical conductor 45 to left turn signal lamp LT on the left rear of the vehicle being towed and thence to ground 7 in the conventional manner. If a second vehicle is added to the related combination, right and left rear turn signals on said vehicle and their associated electrical conductors would be paralleled with electrical conductors 45 and 46 through inter-vehicle electrical cable connectors such as indicated at 41 and 42.

Components of my invention are contained within a box or any convenient mounting method, or configuration 6 shown by the dotted outline in the figure of the drawing. Further relating to the figure, the electrical designations and values of components contained within 6 are herewith enumerated: 1 is a zero to one direct current milliammeter, 2 is a non-critical resistance having a value of approximately 0.3 ohm, 3 is a variable resistance having a maximum value of 500,000 ohms, 4 is a conventional double pole, single throw, normally open toggle switch, 5 is a low current pilot light which illuminates the face of milliammeter 1. It will be appreciated that pilot light 5 is not fundamentally related to my basic invention, except as a convenience to the tow vehicle operator.

Again referring to the figure of the drawing and more specifically to that portion of the figure within the dotted outline, my invention is described in detail as follows. The basic theory of operation of this invention is based upon the fact that a greater value of electrical current flows in any automotive signaling system circuit when all signal lamps in a specific group such as right or left banks of lamps are operating properly. A determination of proper function, or malfunction of one or more turn signal lamps on vehicles operated in combination is accomplished as follows. When ignition switch 16 is closed and activating switch 4 is closed, a low resistance electrical circuit consisting of conductor 11, activating switch 4, electrical conductor 8, resistance 2, and electrical conductor 12 is placed in shunt across flasher 20 thus placing the electrical potential from battery 13 directly upon contact 22 of signaling switch assembly 31 by means of electrical conductors 18, 19, and 21. Also in shunt to flasher 20 is a branch electrical current path consisting of electrical conductor 11, activating switch 4, electrical conductor 8, milliammeter 1, variable resistance 3, and electrical conductor 12. Closing ignition switch 16 and activating switch 4 also supplies battery 13 electrical potential to pilot light 5 by means of electrical conductor 10, and thence to ground 7, in the conventional manner.

Since various modifications can be made to the invention herein described within the scope of the inventive concept disclosed, it is not intended that protection of the said invention should be interpreted as restricted to the modification or modifications or known parts of such concept as have been particularly described, defined, or exemplified, since this disclosure is intended to explain the construction, and operation of such concept, and not for the purpose of limiting protection to any specific embodiment or details thereof.

I claim:
1. In a motor vehicle turn signalling system having a source of electric power, a flasher, and a turn signal switch means connected in series, said system further having a plurality of signal lamps connected to said turn signal switch means for energization thereby, a signal lamp monitoring circuit comprising a first shunt circuit connected across the terminals of said flasher and comprising a relatively low value resistance element and a manually operated test switch in series, and a second shunt circuit connected across the terminals of said relatively low value resistance element and comprising a relatively high value variable resistance element and a milliammeter in series, whereby, upon closing of said manually operated test switch, said relatively low value resistance element reduces the effectiveness of said flasher so that a reading may be made of said milliammeter, the adjustment of said variable resistance element calibrating said milliammeter to provide a normal reading corresponding to the number of said signal lamps energized at any one time when all are operative, an off-normal reading thus indicating lamp failure.

References Cited
UNITED STATES PATENTS

| | | | |
|---|---|---|---|
| 1,257,514 | 2/1918 | Meyer | 324—115 |
| 2,064,054 | 12/1836 | Beisley et al. | 315—131 |
| 2,335,248 | 11/1943 | Hanson | 340—52 X |
| 2,400,190 | 5/1946 | Clark | 324—115 |
| 2,671,891 | 3/1954 | Kent | 340—81 |
| 2,681,435 | 6/1954 | Lurie | 324—115 |
| 2,743,431 | 4/1956 | Wright. | |
| 1,997,471 | 4/1935 | Schwarze | 340—251 X |
| 1,997,848 | 4/1935 | Ballou | 340—251 X |
| 2,444,014 | 6/1948 | Williams | 340—52 X |
| 2,692,981 | 10/1954 | Hollins. | |
| 3,388,289 | 6/1968 | Zakus | 340—251 |

FOREIGN PATENTS

| | | |
|---|---|---|
| 164,792 | 11/1905 | Germany. |
| 924,128 | 2/1955 | Germany. |
| 961,516 | 4/1957 | Germany. |
| 644,680 | 6/1928 | France. |

OTHER REFERENCES
German printed application of Kramer, 1,008,131, May 9, 1957.

DONALD J. YUSKO, Primary Examiner

K. N. LEIMER, Assistant Examiner

U.S. Cl. X.R.

340—81, 251